(12) United States Patent
Scott et al.

(10) Patent No.: US 8,631,428 B2
(45) Date of Patent: Jan. 14, 2014

(54) SYSTEM AND METHOD FOR DISPLAYING MEDIA USAGE

(76) Inventors: Charles Scott, Austin, TX (US); Ankur Mukerji, Austin, TX (US); Scott White, Austin, TX (US)

(*) Notice: Subject to any disclaimer, the term of this patent is extended or adjusted under 35 U.S.C. 154(b) by 161 days.

(21) Appl. No.: 12/627,267

(22) Filed: Nov. 30, 2009

(65) Prior Publication Data

US 2011/0131593 A1  Jun. 2, 2011

(51) Int. Cl.
*H04H 60/32* (2008.01)

(52) U.S. Cl.
USPC ............ 725/14; 725/28; 725/34; 725/35; 725/40; 725/51; 725/52; 707/708

(58) Field of Classification Search
USPC ............ 725/9, 14–16, 28, 34–35, 40, 43, 725/51–52; 707/708
See application file for complete search history.

(56) References Cited

U.S. PATENT DOCUMENTS

| | | | |
|---|---|---|---|
| 6,182,094 B1 * | 1/2001 | Humpleman et al. | 715/234 |
| 6,754,904 B1 | 6/2004 | Cooper | |
| 7,895,625 B1 * | 2/2011 | Bryan et al. | 725/46 |
| 8,060,463 B1 * | 11/2011 | Spiegel | 707/609 |
| 2002/0112239 A1 * | 8/2002 | Goldman | 725/46 |
| 2002/0144273 A1 * | 10/2002 | Reto | 725/86 |
| 2003/0005439 A1 * | 1/2003 | Rovira | 725/37 |
| 2004/0231003 A1 * | 11/2004 | Cooper et al. | 725/135 |
| 2005/0060746 A1 * | 3/2005 | Kim | 725/46 |
| 2006/0143653 A1 * | 6/2006 | Suh | 725/46 |
| 2006/0271953 A1 * | 11/2006 | Jacoby et al. | 725/34 |
| 2007/0250866 A1 * | 10/2007 | Yamada | 725/58 |
| 2008/0046408 A1 * | 2/2008 | Rotholtz | 707/3 |
| 2008/0276279 A1 * | 11/2008 | Gossweiler et al. | 725/46 |
| 2009/0002333 A1 * | 1/2009 | Maxwell et al. | 345/173 |
| 2009/0133070 A1 * | 5/2009 | Hamano et al. | 725/46 |
| 2009/0271820 A1 * | 10/2009 | Choi et al. | 725/37 |
| 2009/0293079 A1 * | 11/2009 | McKee et al. | 725/10 |
| 2010/0070858 A1 * | 3/2010 | Morris et al. | 715/706 |
| 2010/0083320 A1 * | 4/2010 | Roberts et al. | 725/61 |

* cited by examiner

*Primary Examiner* — Jason Salce
(74) *Attorney, Agent, or Firm* — G. Michael Roebuck (57) ABSTRACT

A system for executing a method is disclosed for monitoring video data, the method including but not limited to monitoring end user activity data for media usage for a plurality of end user client devices associated with a designated group of end users in an internet protocol television (IPTV) system; receiving from a first one of the end user client devices, avatar data indicating at least one search criterion within the end user activity data; searching the end user activity data based on the at least one search criterion; and sending to the first one of the end user client devices, search result data from the search based on the at least one search criterion.

17 Claims, 10 Drawing Sheets

SYSTEM AND METHOD FOR DISPLAYING MEDIA USAGE

FIELD OF THE DISCLOSURE

The present disclosure relates to the field of monitoring media usage.

BACKGROUND OF THE DISCLOSURE

One of the drivers for home entertainment program (series, movie, or any television (TV) offering) selection has always been popularity among other users. People want to see popular shows when they premiere; and they also want to find popular series in progress so they can participate in conversations in the hours and days immediately after. In most cases, TV currently does not offer indications of what others are watching, so viewing a guide requires the user to remember the show names and channels that people have discussed. The EPG and other interfaces do not show the viewing and recording activity of others, so when deciding what to watch the user must scan through all channels trying to remember shows about which they have heard.

DETAILED DESCRIPTION

Given the privacy concerns of end users, an illustrative embodiment of a system and method provides end user directed privacy controls that include utilizing end user media usage information data as opt in settings defined by the end user (also referred to herein as a end user when the end user is a end user to a network in which the end user uses media), and maintained in the end user's profile. The end user privacy controls are further supplemented with merchant and service provider privacy controls that may be used to restrict access to monitoring end user related data including but not limited to end user identity and end user activity such as phone logs and web surfing history. In another embodiment the end user has strict control over how his personal web surfing, communications, and purchase information can be used in identifiable and non-identifiable ways (i.e., relate data collected anonymously or to a specific user), both in maintaining the product interest correlation system, and in determining what can be acceptably advertised to the end user.

In an internet protocol (IP) media usage monitoring system, the end user has full control over which of her tasks are tracked and how they are tracked (e.g., by identifying the user, generically flagging the data, for the purposes of maintaining product correlation interests, as well as what types of ads can be delivered and under what circumstances the end user is willing to receive them.

Consumers are now provided increasingly more choices in high speed internet protocol Internet access networks. Moreover, consumption of television services and Internet content will be increasing over new delivery systems such as IPTV platforms, digital end user line (DSL), fiber optic, and cable broadband networks, municipal wireless networks, and third generation (3G) mobile networks. End user end user devices used to access these networks can be used to deliver media to end users.

Figure 1:
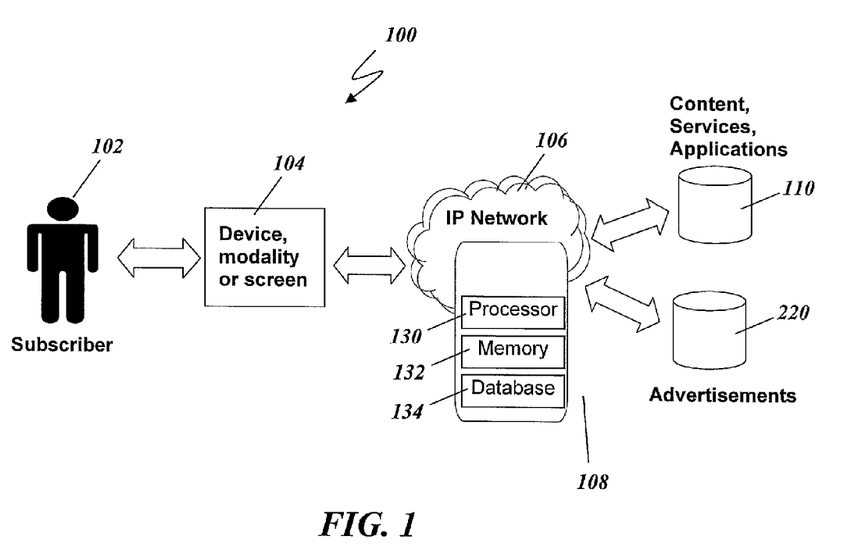
FIG. 1 depicts an illustrative embodiment for delivering advertising data.

Turning now to FIG. 1, FIG. 1 is a high level block diagram of an illustrative embodiment that depicts the role the illustrative embodiment plays in acting as an monitoring intermediary between the end user 102 and a host of media providers including advertisers, content companies and application service providers. The end user communicates using a end user end user device 104 which may include but is not limited to a cell phone, personal computer, PDA, computer mouse, or IPTV receiver and input device, such as a remote control. An illustrative embodiment includes but is not limited to a processor 130 coupled to memory 132 and database 134 in memory. A computer readable medium containing instructions that can be executed by the processor is embedded in the memory. An illustrative embodiment monitors and compiles a end user's activity data including but not limited to current session and the device characteristics of the access device 104 being used to access IP-based services over an IPTV network 106. The end user may use any access device to interact with the IPTV network 106 to access content, services and applications 110. The IPTV network may include but is not limited to a combination of an IPTV network, VoIP network, cellular telephone network, WiMax, WiFi and may access a public switched telephone network (PSTN).

End user activity data includes but is not limited to a end user's media usage, current access device, location and activity (e.g., watching a particular show over an IPTV network, web surfing, gaming, talking on a phone, chatting on the internet, etc.). In an illustrative embodiment, the system and method aggregates, collates and mines surfing and content (music, television, movies, audio books, etc.) media usage as end user activity data across multiple access devices and network access devices and mechanisms (e.g., including but not limited to, IPTV, wireless 3G, high speed Internet access), coordinating the information tightly with end user opt-in preferences, to create a highly targeted and contextualized advertising system for end users of IP-based services (including but not limited to, IPTV, VoIP, email, SMS, mobile calling, web surfing, instant messaging (IM), chatting, blogging, and mobile computing, etc.).

Figure 2:
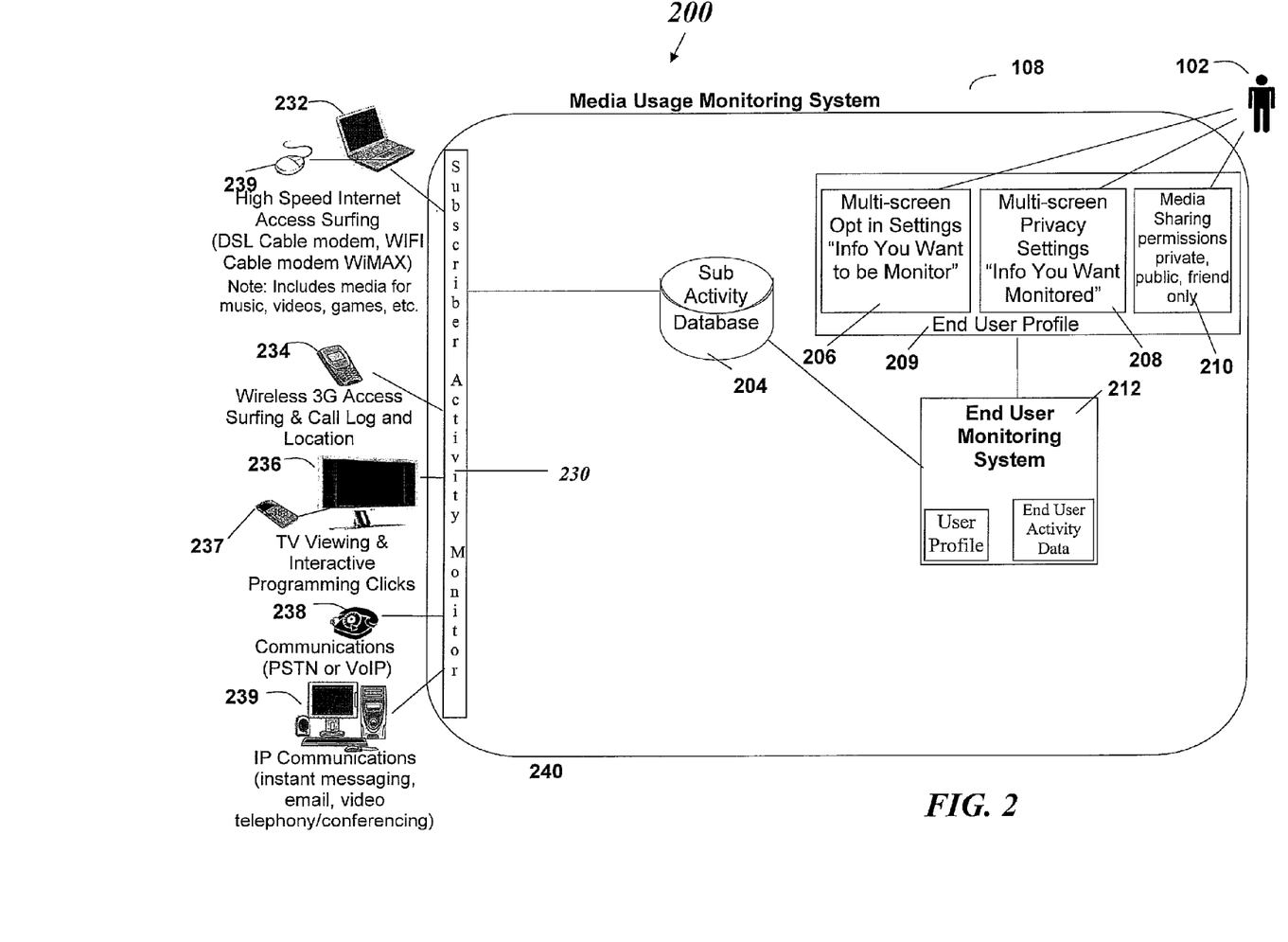
FIG. 2 depicts another illustrative embodiment for monitoring media usage.

Turning now to FIG. 2, the end user activity data monitoring further includes but is not limited to end user profile data 209 and end user profile settings data. End user profile data includes but is not limited to ages, family size, ethnicity, language spoken, address, end user identifiers for family members, etc. End user profile settings may also include but are not limited to multiple screens or device opt-in settings for selecting access devices through which a end user 102 is willing to allow monitoring 208. End user profile settings may also include privacy (opt-in) settings defining specifically what categories of media usage can be monitored or joined, such as allowing an illustrative embodiment to monitor telephone usage and allow other end users to join in a call as conference call with other end users watch a program together or visit a web site together.

In an illustrative embodiment, a system and method perform monitoring of a end users' end user devices activity data used to access the IP network and stores the end user activity data in database 134. The end user devices include but are not limited to telephones 238 calling via a public switched telephone network (PSTN) or connected over a VoIP network, remote controls for television viewing selections and interactive programming clicks or menu selections 236, cell phones 234 using 3G access for accessing the Internet and calling and personal computers/lap top computers and other IP devices 232 using high speed Internet access for web browsing, SMS, IM, email, chatting, text messaging, etc. Location information 235 obtained during the end users' use of mobile and/or portable Internet devices is also provided to the Internet profiling process 230. Given that a end user has "opted in" to allow being monitored for some or all of the information available through the Internet profiling process 230, the Internet profiling process 230 monitors the access devices event data associated for the end user's communications including outgoing calls, telephone numbers called, Internet access surfing history, content consumption, music, videos and games, IM, text messaging, chatting, and locations of a end user, etc. A particular illustrative embodiment monitors digital or analog electronic activity of the end user end user device(s) to store in the end user activity data in the data base.

Within a digital video recorder (DVR) or interactive set-top box (STB) environment, an illustrative embodiment includes a graphical representation on an electronic program guide (EPG), video on demand list (VoD) list, or program details pages on which video or audio programs or shows are being viewed and/or recorded by other end users on an end user's buddies list. The display presents avatars having attributes representing attributes of the end users on the user's buddies list or attributes of other end users. The avatars can also be combined with combined with numeric data indication quantities of a particular end user represented by an avatar for larger numbers of end users.

One of the drivers for home entertainment program (series, movie, or any television (TV) offering) selection has always been popularity among other end users. People want to see popular shows when they premiere; and they also want to find popular series in progress so they can participate in conversations in the hours and days immediately after. In most cases, TV currently does not offer indications of what others are watching, so viewing a guide requires the user to remember the show names and channels that people have discussed. In the past, for the most part the EPG and other interfaces did not show the viewing and recording activity of others, so when deciding what to watch the end user had to scan through all channels trying to remember shows they have heard about. Privacy controls are included to allow all users to opt out of having their data displayed on others lists or to restrict certain types of data. An illustrative embodiment enables an end user to establish a buddies list, where an end user can see the online status of other end users on the buddies list, including but not limited to what the end users are doing in the way of media usage and what type of end user device they are using to access the media they are using. Alternately, the buddies list could be one established for another purpose—e.g., an IM buddy list, an email contact list, a video game console avatar list, and so on.

A particular illustrative embodiment further provides an environment where active end users are logged into an interactive IPTV/DVR interface. An end user is able to display graphical representations on their EPG, VoD catalog or program details pages of shows being watched, downloaded, scheduled to be downloaded, recorded, or scheduled to be recorded by participating members of their buddies list. The end user's list of recorded shows can show historical data on which and how many people from the user's buddies list watched, recorded or performed other actions (e.g., added to a favorites list) upon the show. A "buddies" view of the EPG could be set up displaying only shows with buddy recognition (e.g., what is Jeff recording this week?).

In a particular illustrative embodiment, the interactive TV interface would include valuable data about viewing activity and media usage of people they know. There are so many channels in the EPG and so many VoD selections to choose from, users need ways to easily prioritize the order in which they review program data. Many users would find data about buddy activity extremely valuable in determining which shows to watch. In another illustrative embodiment the system and method are applied to music, news stories, interactive service, and other sorts of media.

In another particular embodiment, a method is disclosed for monitoring video data, the method including but not limited to monitoring end user activity data for media usage for a plurality of end user client devices associated with a designated group of end users in an internet protocol television (IPTV) system; receiving from a first one of the end user client devices, avatar data indicating at least one search criterion within the end user activity data; searching the end user activity data based on the at least one search criterion; and sending to the first one of the end user client devices, search result data from the search based on the at least one search criterion. In another embodiment of the method, the search result further includes but is not limited to electronic program guide data indicating program listings and a plurality of avatars representing a plurality of end users whose media usage indicates that the end users status is selected from the group consisting of watching, recording and have recorded at least one of the program listings. In another embodiment of the method, the media further includes but is not limited to data selected from the group consisting of video streams, end user requests, video channel changes, DVR schedules, audio, telephone, and internet.

In another embodiment of the method, the search result further includes but is not limited to search result avatar data further comprising an avatar search result attribute indicating the search result wherein the search result avatar attribute indicates an end user attribute for an end user indicated by the search result. In another embodiment of the method, at least one of the search result avatar attributes indicates a current end user client device type for the end user indicated by the search result avatar attribute. In another embodiment of the method, the search result criterion further includes but is not limited to a search criterion indicating a buddy list for the first one of the end user devices and a list of current end user devices for the buddy list.

In another embodiment of the method, the search result further includes but is not limited to a search result avatar attribute indicating a current end user device type for each end user on the list of end users. In another embodiment of the method, the search result further includes but is not limited to an IPTV network component associated with the end user device for determining end users and current end user device types currently associated with the IPTV network component, wherein the IPTV network component is selected from the group consisting of a video hub office, intermediate office, central office and a digital service line aggregator. In another embodiment of the method, the method further includes but is not limited to receiving an avatar selection datum from the first one of the end user devices, wherein the avatar selection datum indicates a second end user current end user device; and establishing communication between a current end user device for the first end user and the current end user device for the second end user.

In another embodiment of the method, the end user attribute is selected from the group consisting of gender, age and location. In another illustrative embodiment, a computer readable medium is disclosed containing instructions that when executed by a computer are useful for monitoring video data, the computer program including but not limited to instructions to monitor end user activity data for media usage for a plurality of end user client devices associated with a designated group of end users in an internet protocol television (IPTV) system; instructions to receive from a first one of the end user client devices, avatar data indicating at least one search criterion within the end user activity data; instructions to search the end user activity data based on the at least one search criterion; and instructions to send to the first one of the end user client devices, search result data from the search based on the at least one search criterion. In another illustrative embodiment of the medium, the search result data further includes but is not limited to an electronic program guide indicating program listings and a plurality of avatars representing a plurality of end users whose media usage indicates that the end users status is selected from the group consisting of watching, recording and have recorded at least one of the program listings. In another illustrative embodiment of the medium, the media further includes but is not limited to data selected from the group consisting of video streams, end user requests, video channel changes, DVR schedules, audio, telephone, and Internet.

In another illustrative embodiment of the medium, the search result further includes but is not limited to a search result avatar further comprising an avatar search result attribute indicating the search result wherein the search result avatar attribute indicates an end user attribute for an end user indicated by the search result. In another illustrative embodiment of the medium, at least one of the search result avatar attributes indicates a current end user client device type for the end user indicated by the search result avatar attribute. In another illustrative embodiment of the medium, the search result criterion further includes but is not limited to a search criterion indicating a buddy list for the first one of the end user devices and a list of current end user devices for the buddy list. In another illustrative embodiment of the medium, the search result further includes but is not limited to a search result avatar attribute indicating a current end user device type for each end user on the list of end users. In another illustrative embodiment of the medium, the search result further includes but is not limited to an IPTV network component associated with the end user device for determining end users and current end user device types currently associated with the IPTV network component, wherein the IPTV network component is selected from the group consisting of a video hub office, intermediate office, central office and a digital service line aggregator.

In another illustrative embodiment of the medium, medium further includes but is not limited to instructions to receive an avatar selection datum from the first one of the end user devices, wherein the avatar selection datum indicates a second end user current end user device; and instructions to establish communication between a current end user device for the first end user and the current end user device for the second end user. In another illustrative embodiment of the medium, the end user attribute is selected from the group consisting of gender, age and location.

Figure 3:
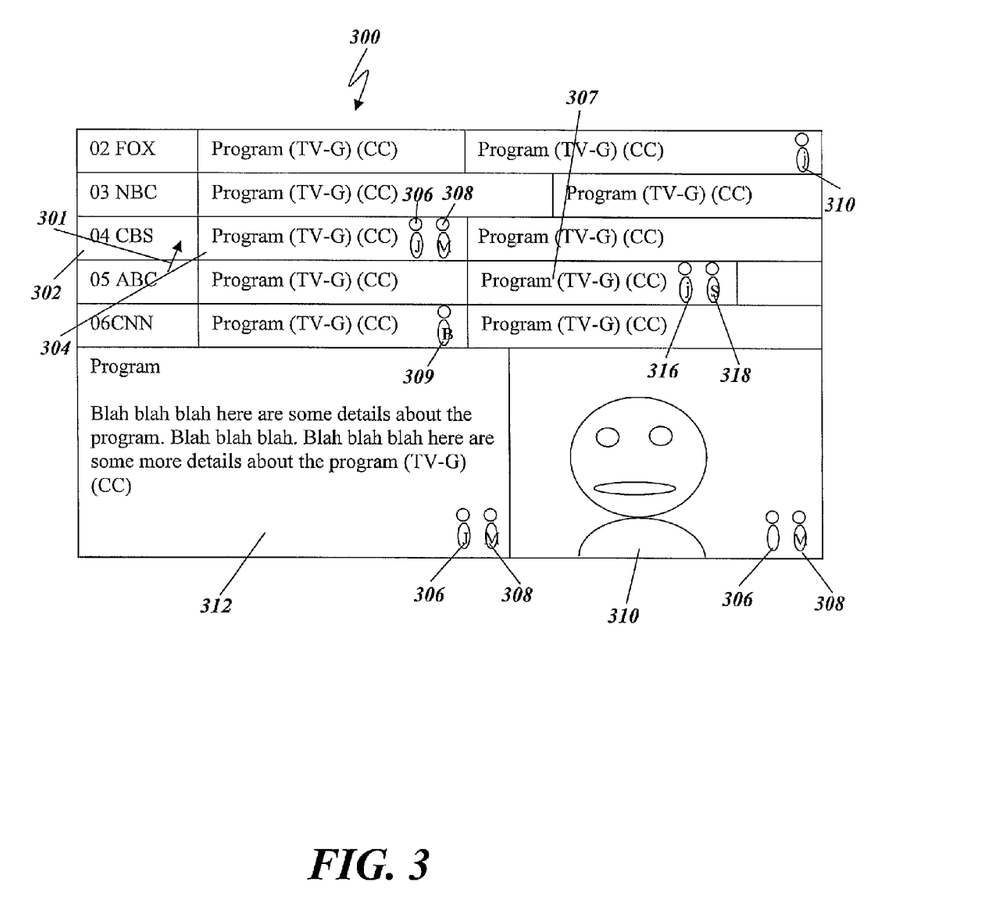
FIG. 3 depicts another illustrative embodiment for monitoring media usage.

Turning now to FIG. 3, as shown in FIG. 3, an illustrative embodiment 300 is depicted in which a cursor 301 selects an EPG listing 302 indicates a current program listing 304 on network CBS and a future program listing 307 on channel 5, network ABC. Avatar 306 and 308 indicate that Jerry and Mary, respectively from the end user's buddies list are both watching a program currently showing on channel 4. Avatars 316 and 318 indicate that John and Suzie are schedule to watch or record channel 5 in the future. Avatar 310 indicates that John is also scheduled to watch or record channel 2 in the future. Avatar 309 indicates that Bob is watching the current program on network CNN on channel 6. A description 312 of the current program 302 selected by cursor 301 is provided in text. A video thumbnail shows video from the current program 302 selected by cursor 301. The illustrative embodiment describes and electronic program guide indication viewing activity, however, the search result avatar data also includes but is not limited to other media usage including but not limited to audio, internet uniform resource locators, telephone and thumbnails from internet usage. In another illustrative embodiment, an end user can click on the search result avatar and join the media usage including but not limited to a telephone call as a conference call when the end user has permission from an end user indicated by the search result avatar data. An end user joins the media usage by clicking on the search result avatar displayed on the end user device.

Figure 4:
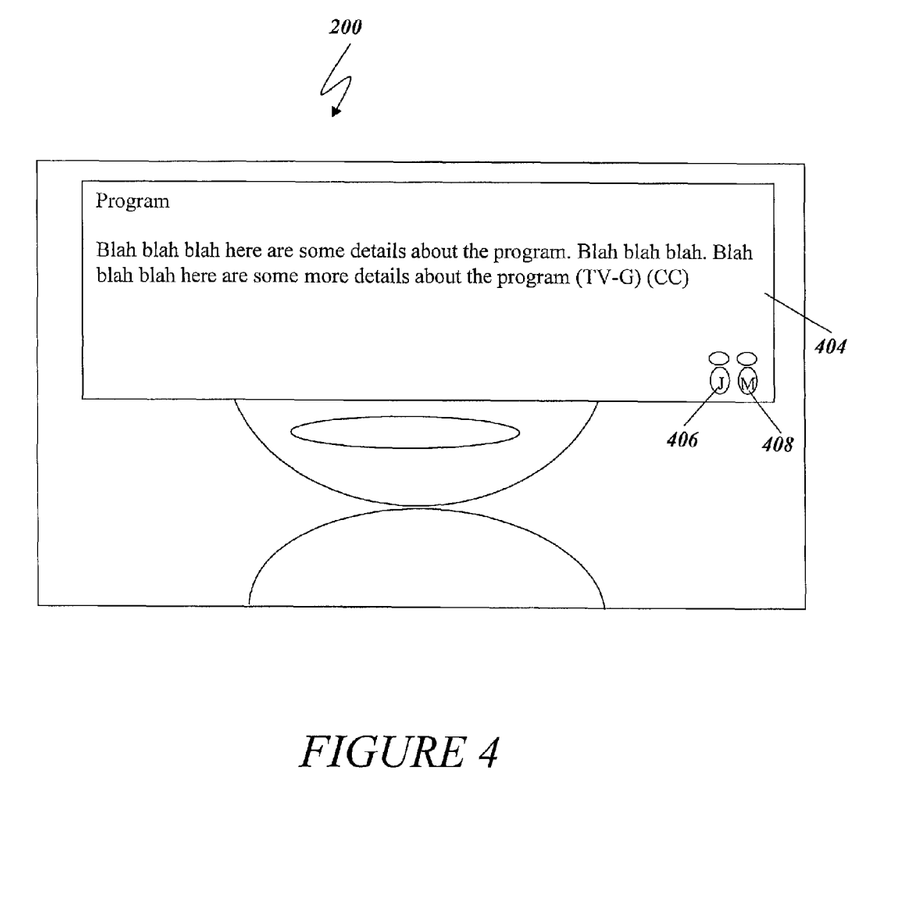
FIG. 4 depicts another illustrative embodiment for monitoring media usage.

Turning now to FIG. 4, during presentation of a current program an end user selects information about the program and an information screen 404 pops up on the end user device display describing the current program being viewed on the end user device and displays avatars 406 and 408 indicating that Jerry and Mary from the end user's buddies list are also watching the program.

Figure 5:
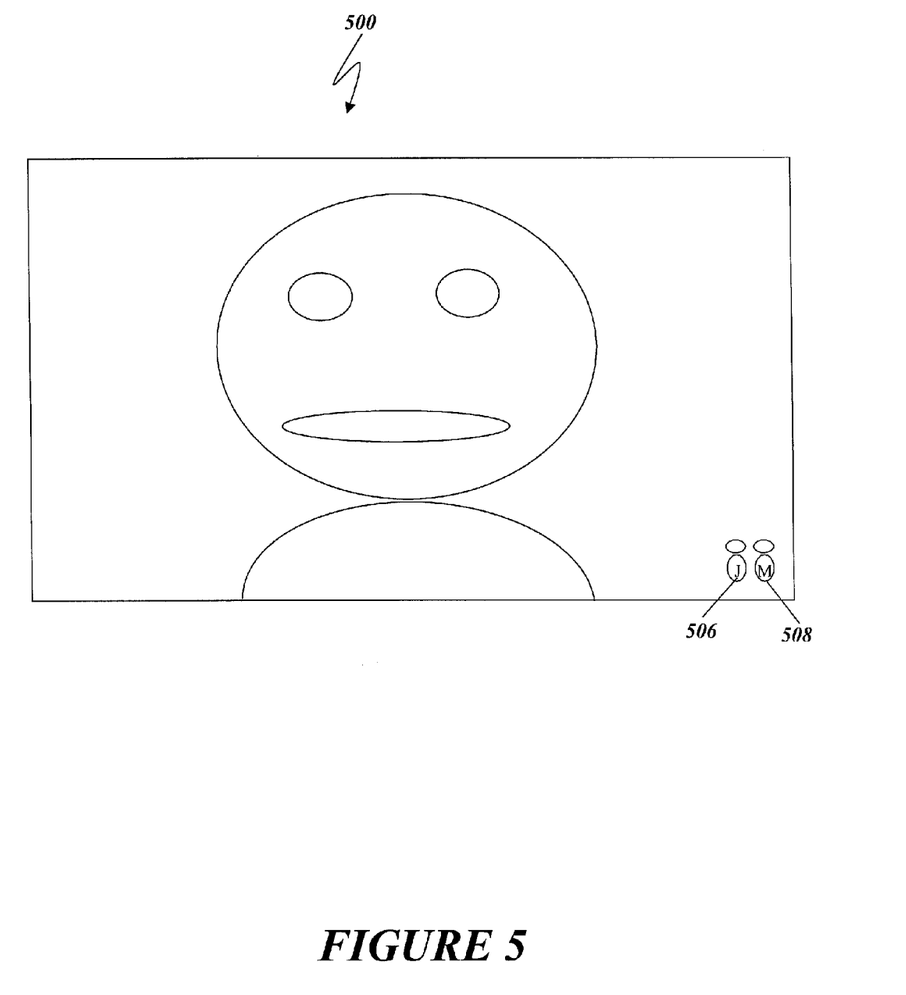
FIG. 5 depicts another illustrative embodiment for monitoring media usage.

Turning now to FIG. 5, as shown in FIG. 5, in another illustrative embodiment, avatars 506 and 508 are displayed on an end user device display as a current program is being presented. Avatars 506 and 508 indicate that Jerry and Mary Jerry and Mary from the end user's buddies list are also watching the program. The program watching example is not limiting as an end user can any media usage by another end user, given permission by the end user being monitored. Messages are sent between all end users and the IPTV network indicating permissions and media usage for storage in the IPTV data base along with the end user activity data.

Figure 6:
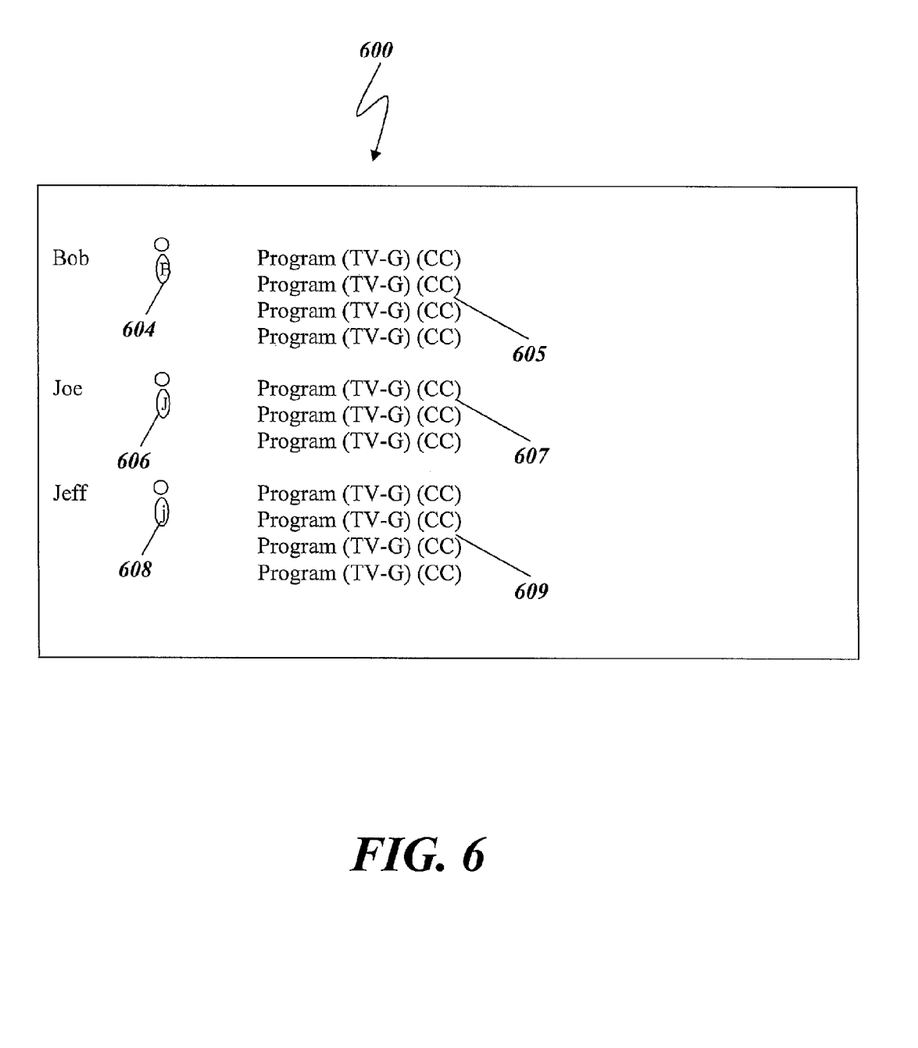
FIG. 6 depicts another illustrative embodiment for monitoring media usage.

Turning now to FIG. 6, as shown in FIG. 6, in another illustrative embodiment, each avatar 604, 606 and 608 are displayed along with a listing 605, 607 and 609 respectively of the programs which each of the end user associated with each of the avatars are watching, have recorded in the past, are presently recording, or have scheduled to record in the future.

Figure 7:
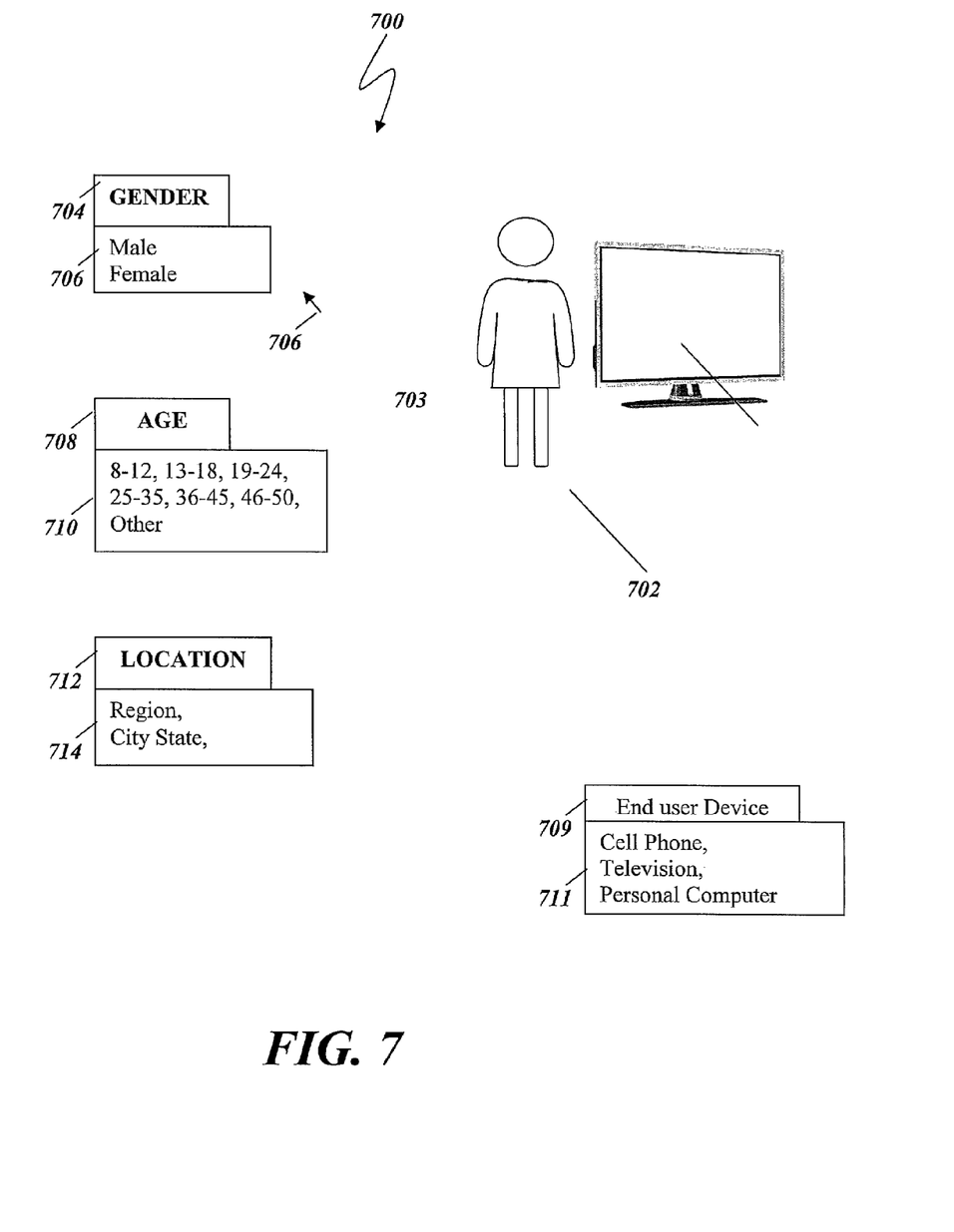
FIG. 7 depicts another illustrative embodiment for monitoring media usage.

Turning now to FIG. 7, as shown in FIG. 7 an illustrative embodiment 700 is depicted in which a search avatar 702 is assigned attributes using attribute selection drop down menus 704, 708, 709 and 712. Drop down menu 704 enables a user to assign a gender attribute (male/female 706) to the search avatar 702. Drop down menu 708 enables a user to assign an age attribute (8-12, 13-18, 19-24, 25-35, 36-45, 46-50, other 710) to the search avatar 502. Drop down menu 512 enables a user to assign a location attribute (region city, state 714) the search avatar 702. Drop down menu 709 enables a user to assign an end user device attribute (cell phone, television, personal computer, etc. 711) to the search avatar 702. Once the attributes have been defined for an avatar, the avatar can be used as a search term into the end user activity data base to find out what end user's having the attributes of the defined search avatar 702 are watching, recording, have recorded or are scheduled to record or watch. Thus an end user can define an avatar to have attributes of male, age 19-24 in Houston, Tex. watching or other wise using media. The search result can also be displayed as an avatar indicating end user attributes and an end user device type upon which the end users are watching the program. The search terms and search avatar can be further refined by adding an end user device attribute to see how many males, ages 19-24 in Houston, Tex. are watching a program on a particular end user device type, e.g., a cell phone.

Figure 8:
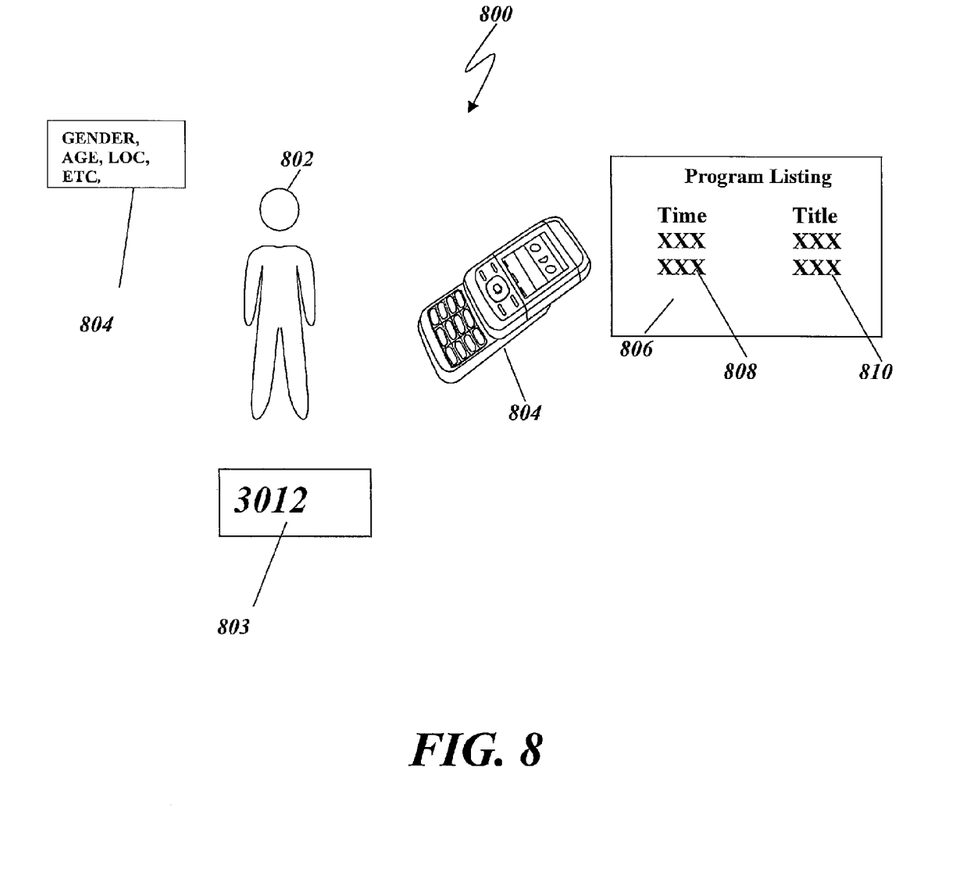
FIG. 8 depicts another illustrative embodiment for monitoring media usage.

Turning now to FIG. 8, as shown in FIG. 8 in a particular illustrative embodiment, a search result of a search into end user activity data base is represented as a search result avatar 802. The search result avatar indicates the attributes of end users who are watching, recording, have recorded or scheduled to record a particular program. The search result also includes a program listing 806 indicating a program title 810 and program time 808 that is being watched, recorded, have recorded or scheduled to record by the end users having the end user attributes that match the search avatar's attributes. That is, an end user can search for what are the males, ages 19-24 in Houston, Tex. watching. A quantity 803 for the search result avatar is also displayed along with search result avatar. Search result avatar attributes are displayed when an end user places a mouse cursor over a particular region of the search result avatar.

Figure 9:
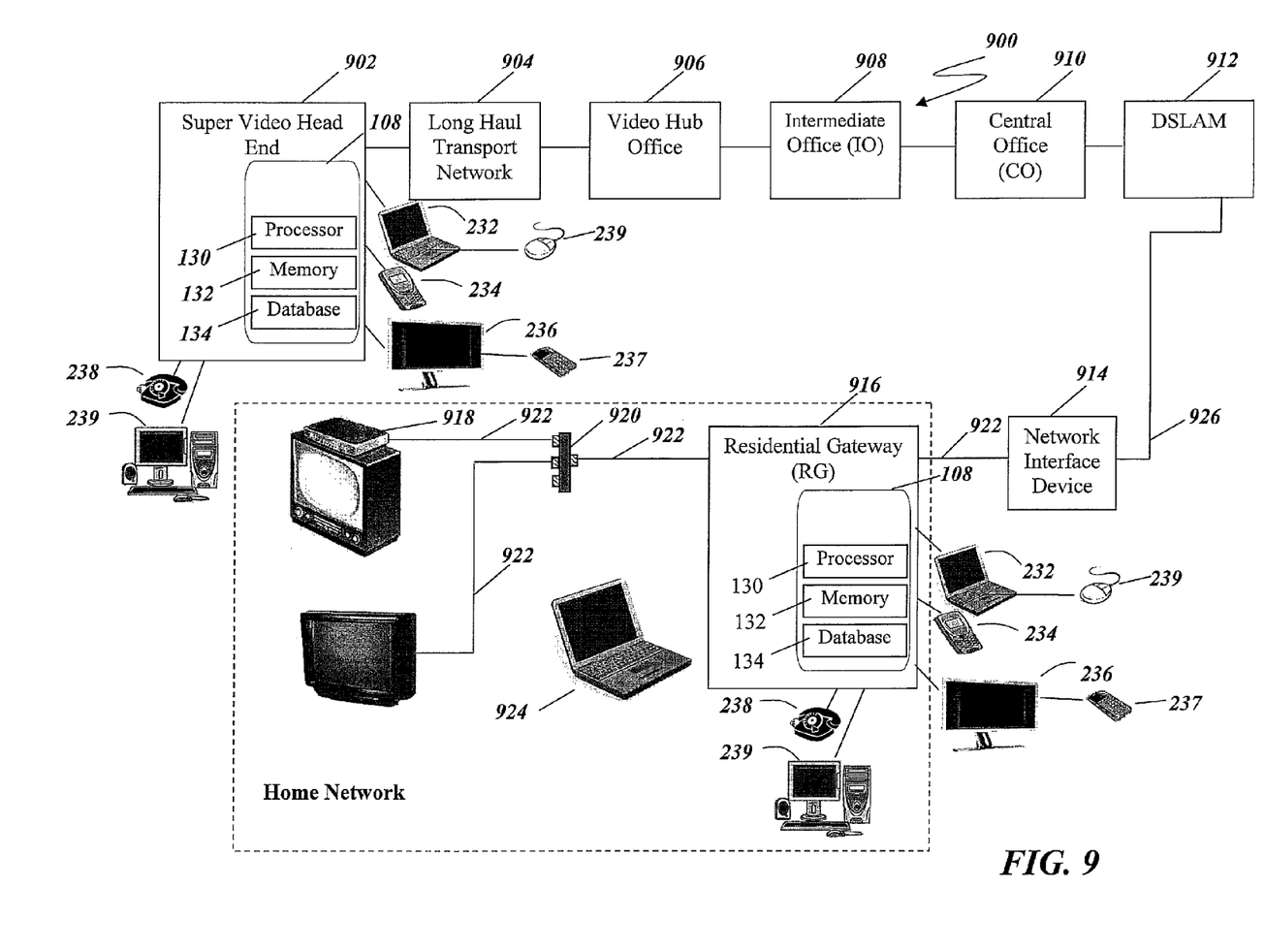
FIG. 9 depicts another illustrative embodiment for monitoring media usage.

Turning now to FIG. 9, FIG. 9 is a schematic diagram of an illustrative embodiment showing in an IPTV network. As shown in FIG. 9, in an illustrative embodiment, an illustrative embodiment may be associated or contained in a super video head end 902, a residential gateway 916 or a set top box 918. As shown in FIG. 9, the super video head end 902 (e.g., satellite ground station that receives channels via satellite and encodes for distribution over IP network) relays a video and data signal to a long haul transport network 904 (e.g. Gigabit Ethernet). The processor monitors end user activity data inputs associated with the end user access devices. The end user activity data is monitored by the processor 130. As discussed above, end user activity data may be collected from end user communications as a end user uses a end user device (or inputting files created by a service provided based on end user verbal or text input), including creating a user profile, or various other activities discussed above, including but not limited to using a end user access device which may include but is not limited to a PSTN telephone 238, cell phone 234, personal computer 239, PDA, computer mouse 239, or IPTV receiver 236 and input device, such as a remote control 237, web tablet, lap top computer, pocket PC, and mobile IP device. In an illustrative embodiment, the system includes a processor 130 coupled to memory 132 and database 134 in memory. A computer readable medium containing instructions that can be executed by the processor is embedded in the memory.

A super head office (SHO) provide data to a long haul transport network 904 which relays the media data to a video hub office 906 (e.g., metro office that receives video and data from super video head end (HE) and inserts local channels). The video hub office 906 relays the signal to the intermediate office (JO) 908 (e.g. Gigabit Ethernet). The TO 908 relays the signal to the central office (CO) 910 (e.g. Telco Central Office delivering voice, data, and video to neighborhoods via Gigabit Ethernet links). The video serving office 910 relays the signal to a digital end user line aggregator (DSLAM) 912 (e.g. fiber to the Home Network, fiber to the Node Network with very high data rate video end user line (VDSL) delivery to the home). Each of the SHO, VHO, IO, CO, DSLAM and STB contain a processor 130, computer readable medium memory 132 and database 134. The DSLAM 912 relays the signal via a fiber optic link (if fiber to the home (FTTH) is used to carry the video and data) or telephone wiring (if fiber to the node (FTTN) is used to carry the video and data) 926 to the network interface device (NID) 914. The NID 914 relays the signal via the coaxial cable 922 to a gateway such as a residential gateway (RG) 916. The system includes a processor 130 coupled to memory 132 and database 134 in memory. A computer readable medium containing instructions that can be executed by the processor is embedded in the memory. From the RG 916 the signal is relayed via the coaxial cable 922 to the coaxial splitter 920, which splits the signal via coaxial cables 922 to an STB 918, and other television sets on the home network. The signal can also be sent to laptop computers 924. The above example is for illustration only and can be implemented in numerous different ways in another particular embodiment of an IPTV system or in another particular embodiment of another system.

In an illustrative embodiment, the system identifies which IPTV network component is serving media to an end user device and stores this data in data base 134, which enables an end user or another user accessing the data base 134 to determine which of a plurality of IPTV network components (SHO, VHO, CO, IO, DSLAM) is providing the media being used by a particular end user.

Figure 10:
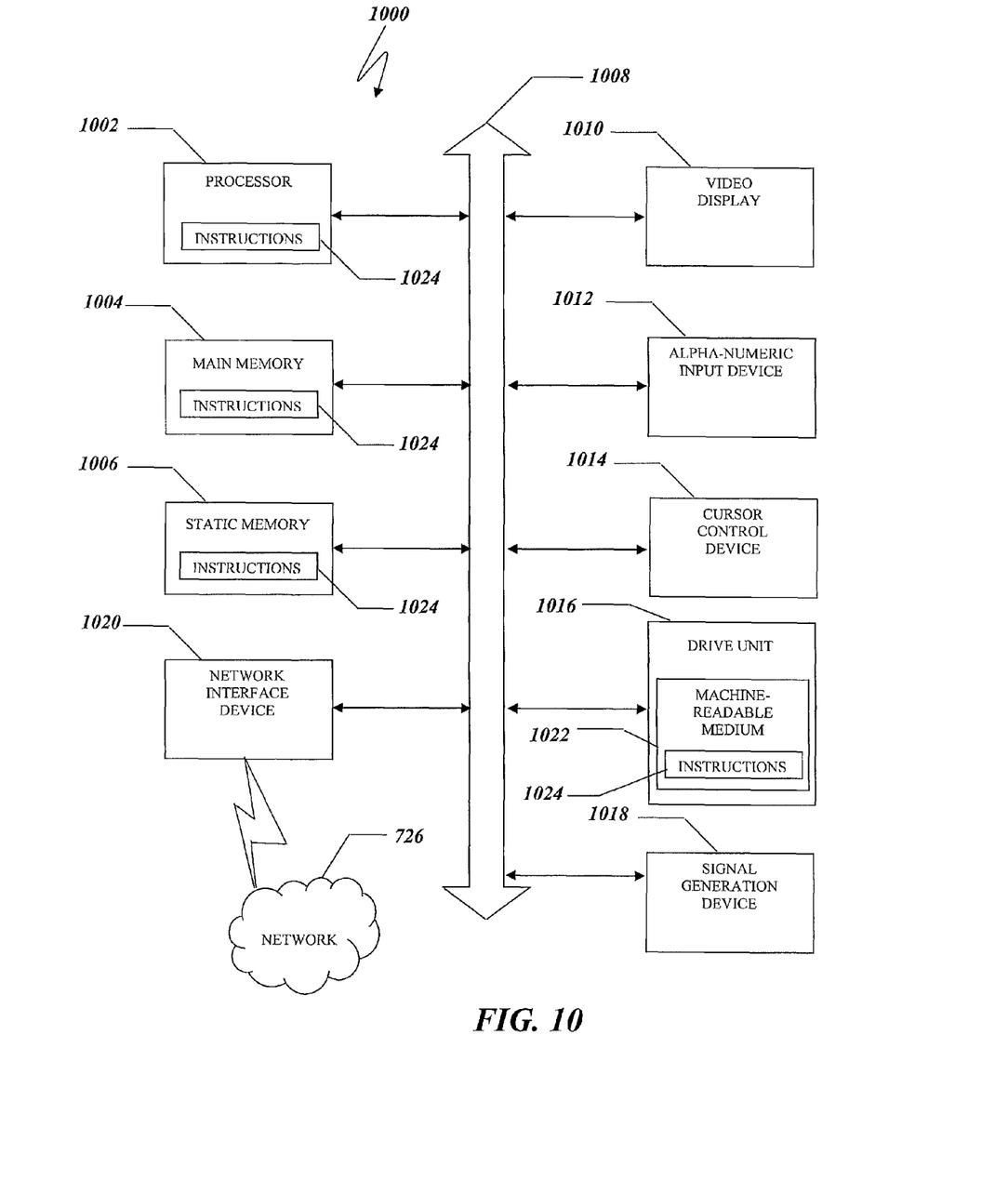
FIG. 10 depicts an illustrative embodiment of a machine for performing functions disclosed in an illustrative embodiment.

FIG. 10 is a diagrammatic representation of a machine in the form of a computer system 800 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystals display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface.

The disk drive unit 1016 may include a machine-readable medium 1022 on which is stored one or more sets of instructions (e.g., software 1024) embodying any one or more of the methodologies or functions described herein, including those methods illustrated in herein above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

As shown in FIG. 10, the present invention contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020. The machine readable medium may also contain a data structure for containing data useful in providing a functional relationship between the data and a machine or computer in an illustrative embodiment of the disclosed system and method.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape embodying computer instructions in a transmission medium; and/or a digital file attachment to e-mail or other self-contained information archive or set of archives is considered a distribution medium equivalent to a tangible storage medium. Accordingly, the invention is considered to include any one or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for monitoring video data usage, the method comprising:
   monitoring end user activity data for media usage for a plurality of access devices associated with a first one of a plurality of end users in an internet protocol television system;
   receiving from a first one of the access devices, avatar data indicating a plurality of search criteria comprising gender, age, location and end user device type for searching within the end user activity data;

searching the end user activity data based on the search criteria;

sending to the first one of the access devices, search result data from the search based on the search criteria, wherein the search result data indicates media usage for each of a plurality of avatars having all of the plurality of search criteria, wherein each of the plurality of avatars represents one of a plurality of end users whose media usage indicates that the each of the plurality of end users are watching, recording, or have recorded a program listings, wherein the search result data comprises avatar attributes that indicate a current access device for a second end user;

receiving avatar selection data from the first access device indicating a second end user selected from one of the plurality of avatars;

determining if a profile setting for an end user profile for the second end user indicates that media usage for the second access device can be joined; and joining the second access device with the first end user client device in the media usage when the end user profile for the second access device indicates that the first end user can be joined in the media usage.

2. The method of claim 1, wherein the media usage is a conference telephone call including the first end user and wherein the joining includes joining the second end user in the conference telephone call including the first end user.

3. The method of claim 1, wherein the media further comprises video streams and the joining includes the second end user joining in visiting a web site with the first end user.

4. The method of claim 1, wherein the search result data indicates an end user attribute for an end user indicated by the search result data.

5. The method of claim 1, wherein the search criteria indicates a buddy list for the first one of the end user devices and a list of end user devices for the buddy list.

6. The method of claim 5, wherein the search result data further comprises a search result avatar attribute indicating a current end user device type for each end user on the list of end users wherein the current end user device type is not indicated in an end user's profile for the end users on the buddy list.

7. The method of claim 5, the method further comprising:
receiving an avatar selection datum from the first one of the end user client devices, wherein the avatar selection datum indicates a second current access device; and
establishing communication between a current end user access device for the first end user and the current access device for the second end user.

8. The method of claim 4, wherein the search result data is a location.

9. A non-transitory computer readable medium containing a computer program comprising instructions that when executed by a computer monitor video data, the computer program comprising:
instructions to monitor end user activity data for media usage for a plurality of access devices associated with a first one of a plurality of end users in an interne protocol television system;
instructions to receive from a first one of the access devices, avatar data indicating a plurality of search criteria comprising gender, age, location and end user device type for searching within the end user activity data;

instructions to search the end user activity data based on the search criteria;

instructions to send to the first one of the access devices, search result data from the search based on the search criteria, wherein the search result data indicates media usage for each of a plurality of avatars having all of the plurality of search criteria, wherein each of the plurality of avatars represents one of a plurality of end users whose media usage indicates that the each of the plurality of end users are watching, recording, or have recorded a program listings, wherein the search result data comprises avatar attributes that indicate a current access device for a second end user;

receiving avatar selection data from the first access device indicating a second end user selected from one of the plurality of avatars;

determining if a profile setting for an end user profile for the second end user indicates that media usage for the second access device can be joined; and joining the second access device with the first end user client device in the media usage when the end user profile for the second access device indicates that the first end user can be joined in the media usage, instructions to determine if a profile setting for the end user profile for the second end user indicated by the avatar selection data indicates that the media usage can be joined; and instructions to join the second end user with first end user in the media usage when the profile setting for media usage indicates that the first end user can be joined in the media usage.

10. The medium of claim 9, wherein the media usage is a conference telephone call including the first end user and the joining is joining the second end user in the conference telephone call including the first end user.

11. The medium of claim 9, wherein the media further comprises and the instructions comprise instructions to join the second end user joining in visiting a web site with the first end user.

12. The medium of claim 9, wherein the search result data further indicates an end user attribute for an end user indicated by the search result.

13. The medium of claim 9, wherein the search indicates a buddy list for the first one of the end user devices and a list of current end user devices for the buddy list.

14. The medium of claim 13, wherein the search result data further comprises a search result avatar attribute indicating a current end user device type for each end user on the list of end users.

15. The medium of claim 14, wherein the search result further comprises an internet protocol television network component associated with the end user device for determining end users and current end user device types currently associated with the internet protocol television network component, wherein the internet protocol television network component is a digital service line aggregator.

16. The medium of claim 13, the computer program further comprising:
instructions to receive an avatar selection datum from the first end user client device, wherein the avatar selection datum indicates a second current access device; and
instructions to establish communication between a current end user device for the first end user and the second end user device for the second end user.

17. The medium of claim 12, wherein the search result data is gender, age and location.

\* \* \* \* \*